(12) United States Patent
Cheng

(10) Patent No.: US 6,783,281 B2
(45) Date of Patent: Aug. 31, 2004

(54) OPTICAL FIBER CONVERTER RETAINING DIFFERENT SIZED FERRULES

(75) Inventor: Yung Chang Cheng, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/305,623

(22) Filed: Nov. 27, 2002

(65) Prior Publication Data

US 2004/0033028 A1 Feb. 19, 2004

(30) Foreign Application Priority Data

Aug. 13, 2002 (TW) .................................. 091212547 U

(51) Int. Cl.$^7$ ............................................... G02B 6/38
(52) U.S. Cl. ........................................ 385/55; 385/72
(58) Field of Search ............................ 385/55, 72, 78, 385/70

(56) References Cited

U.S. PATENT DOCUMENTS

| | | | | |
|---|---|---|---|---|
| 5,317,663 A | * | 5/1994 | Beard et al. ................... | 385/70 |
| 6,164,835 A | * | 12/2000 | Imasaki ......................... | 385/72 |
| 6,419,402 B1 | * | 7/2002 | Zimmel ......................... | 385/86 |
| 6,428,215 B1 | * | 8/2002 | Nault ............................ | 385/78 |

* cited by examiner

Primary Examiner—Chandrika Prasad
(74) Attorney, Agent, or Firm—Wei Te Chung

(57) ABSTRACT

An optical fiber converter is adapted to interconnect a first and a second optical connector together, each connector being of a different type. The optical fiber converter has a ferrule subassembly (3), a sleeve (5), a spring (4), a plug housing (2) and a receptacle housing (6). The ferrule subassembly has a first ferrule (32) having a first central hole, a second ferrule (33) having a second central hole, and a ferrule holder (34) holding the first and second ferrules together. An optical fiber (31) is retained in the first and second central holes, which are coaxially aligned. The sleeve coaxially retains the second ferrule and engages with the second optical connector. The plug housing retains the ferrule holder and is adapted to engage with the first optical connector. The receptacle housing engages with the plug housing, and is adapted to engage with the second optical connector.

19 Claims, 6 Drawing Sheets

OPTICAL FIBER CONVERTER RETAINING DIFFERENT SIZED FERRULES

BACKGROUND OF THE INVENTION

1. Field of the Invention

The present invention relates to an optical fiber converter, and particularly to an optical fiber converter for converting a traditional optical fiber connector into an SFF (Small Form Factor) optical fiber connector.

2. Description of Related Art

Optical fiber connectors are widely used in optical communication systems. For example, optical fiber connectors are used to join optical fibers together to form a longer length fiber run, or to connect an optical fiber to a device.

Different types of optical fiber connectors have different mechanical structures. A conventional connector and an SFF (Small Form Factor) connector, for instance, have ferrules of different diameters. A ferrule accommodates an optical fiber therein. A conventional optical fiber connector, such as an SC (Subscriber Connector) or FC (Face Connector) type connector, has a ferrule with an outer diameter of approximately 2.5 mm. An SFF optical fiber connector, such as an LC type connector made to meet a demand for high-density communication ports, has a ferrule with an outer diameter of approximately 1.25 mm. (The LC type connector is a connector defined by the Lucent Company, which has become an industrial standard in the field of connectors.) Such different types of optical fiber connectors cannot be directly interconnected, which results in practical problems.

Therefore, a need exists for an optical fiber converter which interconnects two different types of optical fiber connectors. In particular, a need exists for an optical fiber converter which interconnects a conventional optical fiber connector and an SFF optical fiber connector.

SUMMARY OF THE INVENTION

Accordingly, an object of the present invention is to provide an optical fiber converter which interconnects two different types of optical fiber connectors.

Another object of the present invention is to provide an optical fiber converter which interconnects a conventional optical fiber connector and an SFF optical fiber connector.

In order to achieve the objects set forth, an optical fiber converter is adapted to interconnect a first optical fiber connector and a second optical fiber connector, each connector being of a different type. The optical fiber converter comprises a ferrule subassembly, a sleeve, a spring, a plug housing and a receptacle housing. The ferrule subassembly further comprises a first ferrule having a first central hole extending therethrough, a second ferrule having a second central hole extending therethrough, a ferrule holder and an optical fiber. The first and second ferrules are fixedly held by the ferrule holder, the first and second central holes are coaxially aligned, and the optical fiber is retained in the first and second central holes. The sleeve coaxially retains the second ferrule and is adapted to receive a ferrule of the second optical fiber connector. The plug housing retains the ferrule holder and is adapted to engage with the first optical fiber connector. The receptacle housing engages with the plug housing, and is adapted to engage with the second optical fiber connector.

Other objects, advantages and novel features of the invention will become more apparent from the following detailed description when taken in conjunction with the accompanying drawings.

DETAILED DESCRIPTION OF THE INVENTION

Figure 1:
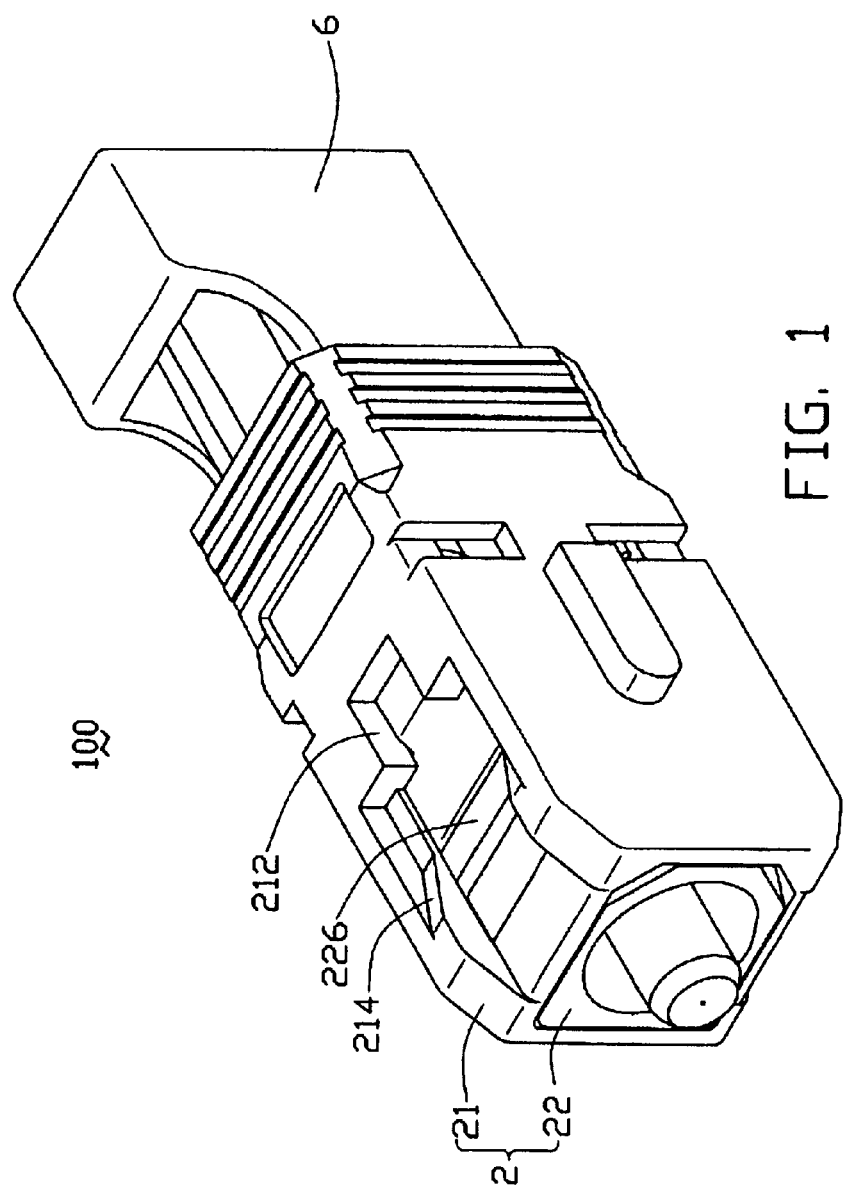
FIG. 1 is a perspective view of an optical fiber converter in accordance with the present invention.
Figure 2:
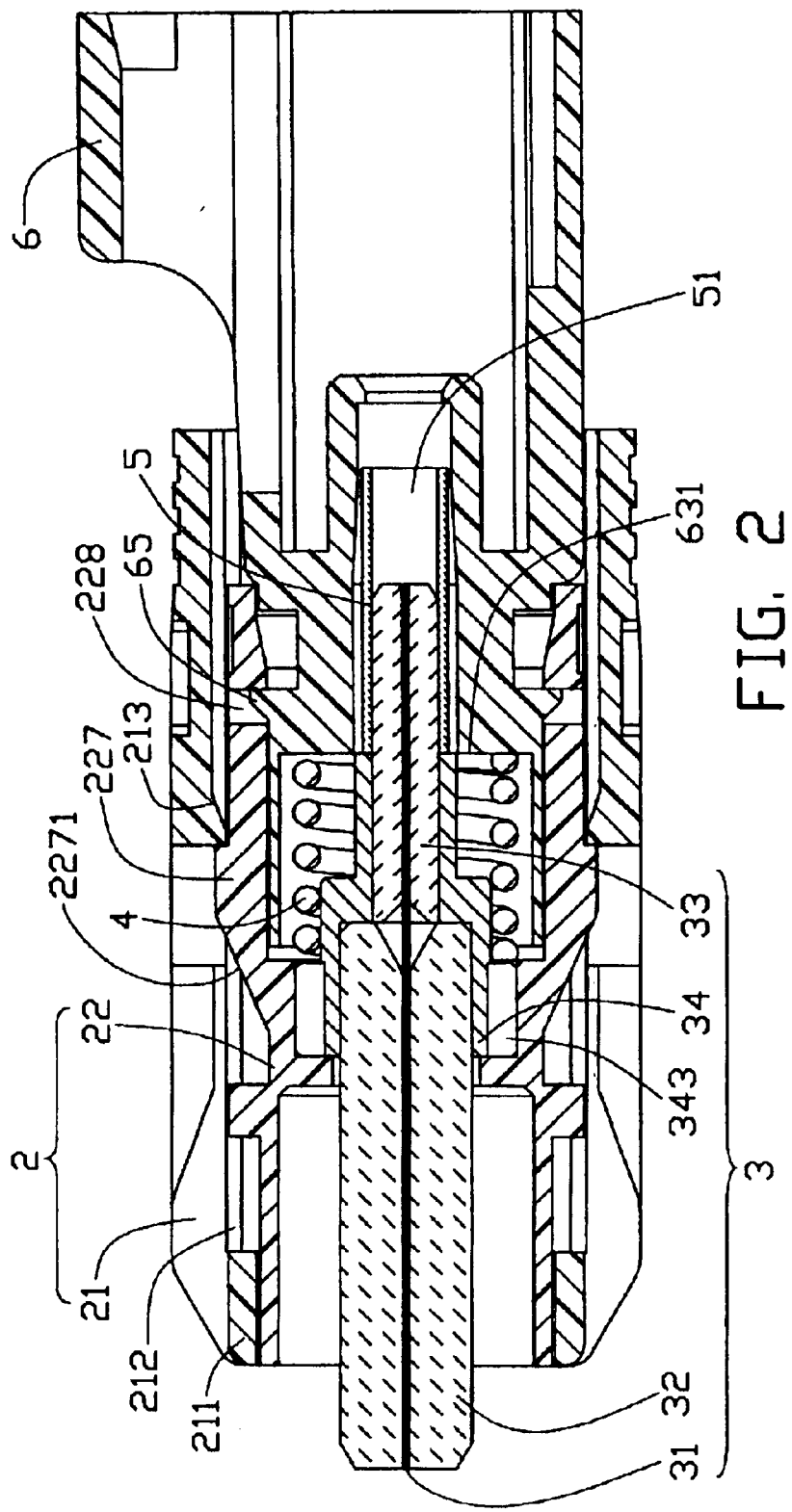
FIG. 2 is a cross-sectional view of the optical fiber converter of FIG. 1.

Referring to FIG. 1 and FIG. 2, an optical fiber converter 100 in accordance with the present invention is adapted to interconnect an SC-type optical fiber connector (not shown) and an LC-type optical fiber connector (not shown). The optical fiber converter 100 comprises a ferrule subassembly 3, a sleeve 5, a spring 4, a plug housing 2 and an L-shaped receptacle housing 6.

Figure 3:
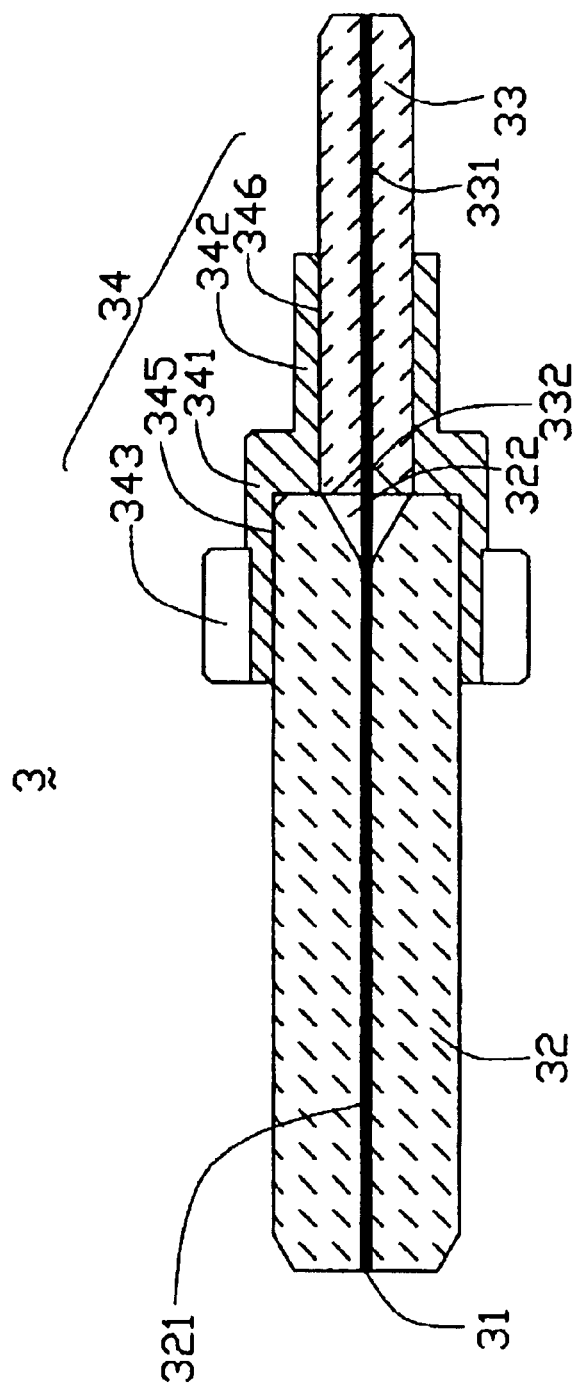
FIG. 3 is a cross-sectional view of a ferrule subassembly of the optical fiber converter of FIG. 1.

Referring to FIG. 3, the ferrule subassembly 3 further comprises a first ferrule 32, a second ferrule 33, a ferrule holder 34 and an optical fiber 31. A first central hole 321 and a second central hole 331 axially extend through the first ferrule 32 and the second ferrule 33, respectively. The first and second ferrules 32, 33 have two different outer diameters of approximate 2.5 mm and 1.25 mm, respectively. A tapered surface 322 is defined on a first end (not labeled) of the first ferrule 32 and in communication with the first central hole 321. A tapered surface 332 is also defined on a first end (not labeled) of the second ferrule 33 and in communication with the second central hole 331. The ferrule holder 34 comprises a first cylinder 341 and a second cylinder 342 connected with the first cylinder 341. A plurality of flanges 343 extend outwardly from the first cylinder 341. The plurality of flanges 343 further comprises a cylindrical outer surface (not labeled) coaxial with the first and second cylinders 341, 342. A first cavity 345 and a second cavity 346 in communication with the first cavity 345 are defined in the ferrule holder 34, and are coaxially aligned. The first ends of the first and second ferrules 32, 33 are retained in the first and second cavities 345, 346, respectively. Thus, the first and second ferrules 32, 33 are fixedly held by the ferrule holder 34, with the first and second central holes 321, 331 being coaxially aligned. The optical fiber 31 is inserted into the first and second central holes 321, 331 in turn and is retained therein. The tapered surfaces 322, 332 on the first ends of the first and second ferrules 32, 33 oppose each other, and help the optical fiber 31 to be easily extended through the first and second central holes 321, 331.

Referring back to FIG. 2, the sleeve 5 has a generally tubular shape and defines a through hole 51 therein with an inner diameter of approximate 1.25 mm for receiving the second ferrule 33. The sleeve 5 is preferably made of ceramic, to aid good alignment precision and to attain stable performance under a temperature variation.

Referring also to FIG. 1, the plug housing 2 is adapted to engage with an SC-type optical fiber connector (not shown)

at a front end (not labeled), and further comprises a hollow cubic outer housing 21 and a hollow cubic inner housing 22 covered by the outer housing 21. The outer housing 21 further comprises four sidewalls 211 and a generally rectangular first opening (not labeled). The first opening is surrounded by the four sidewalls 211, and the first opening extends through the outer housing 21 along a longitudinal direction of the outer housing 21 for receiving the inner housing 22 therein. A pair of cutouts 212 are defined through two opposing sidewalls 211 for engaging of the outer housing 21 with the inner housing 22. A pair of wedge-shaped protrusions 213 extend inwardly from the same two opposing sidewalls 211, and are adjacent to the corresponding cutouts 212, respectively. A pair of inclined portions 214 are formed on two opposite sides of each of the two cutouts 212, respectively.

Figure 4:
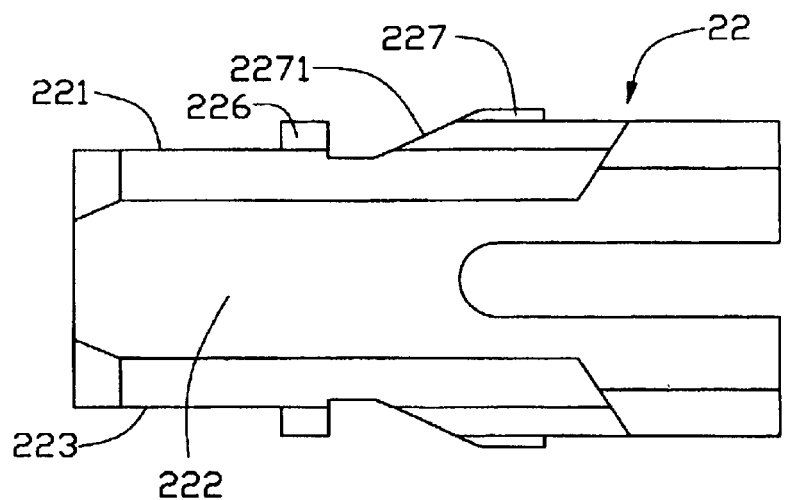
FIG. 4 is a side view of an inner housing of the optical fiber converter of FIG. 1.
Figure 5:
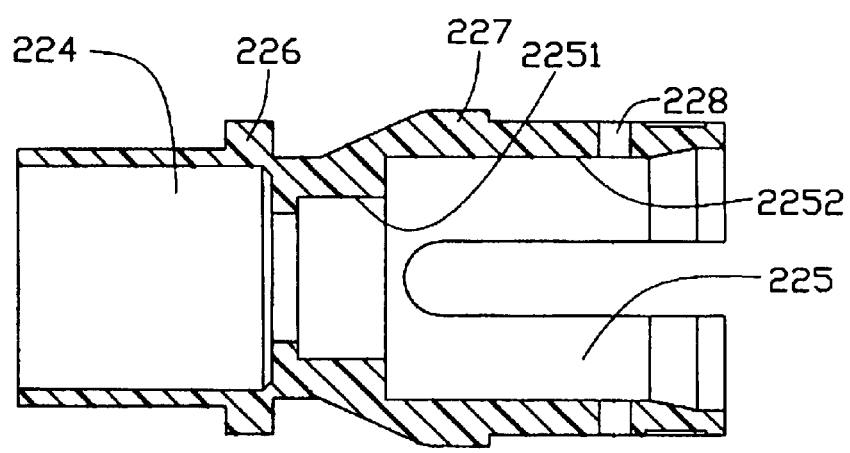
FIG. 5 is a cross-sectional view of the inner housing of FIG. 4.

Referring to FIG. 4 and FIG. 5, the inner housing 22 comprises a top wall 221, a bottom wall 223 and two side walls 222 connecting the top wall 221 and the bottom wall 223 together. A first housing cavity 224 and a second housing cavity 225 in communication with the first housing cavity 224 are defined in the inner housing 22. The second housing cavity 225 has a cylindrical first inner surface 2251 and a cylindrical second inner surface 2252 with different diameters, and the cylindrical first and second inner surfaces 2251, 2252 are coaxially aligned. A pair of rectangular first protrusions 226 extends outwardly from the top wall 221 and bottom wall 223, respectively. A pair of second protrusions 227 also extends outwardly from the top wall 221 and bottom wall 223, and each second protrusion 227 has an inclined surface 2271. A pair of mounting cutouts 228 are defined through rear ends (not labeled) of the top wall 221 and bottom wall 223, respectively.

Figure 6:
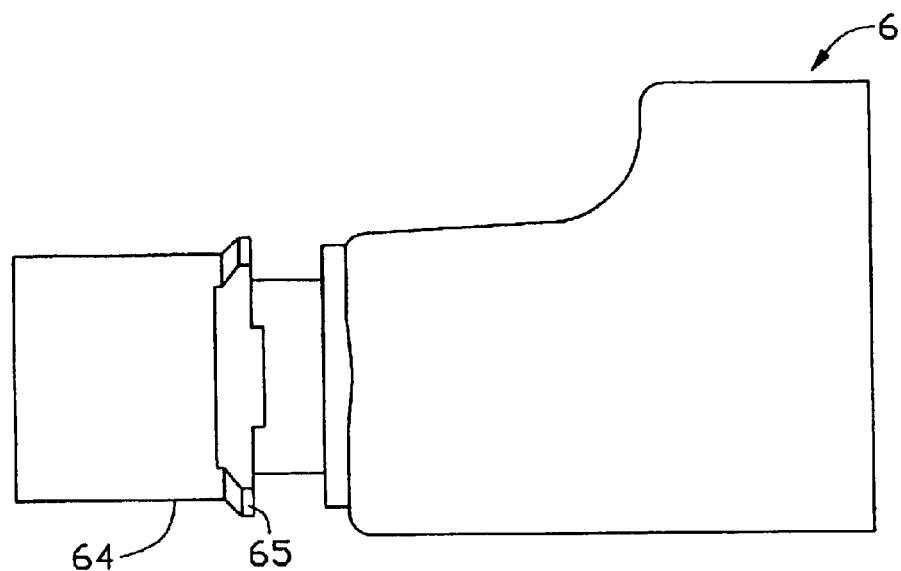
FIG. 6 is a side view of a receptacle housing of the optical fiber converter of FIG. 1.
Figure 7:
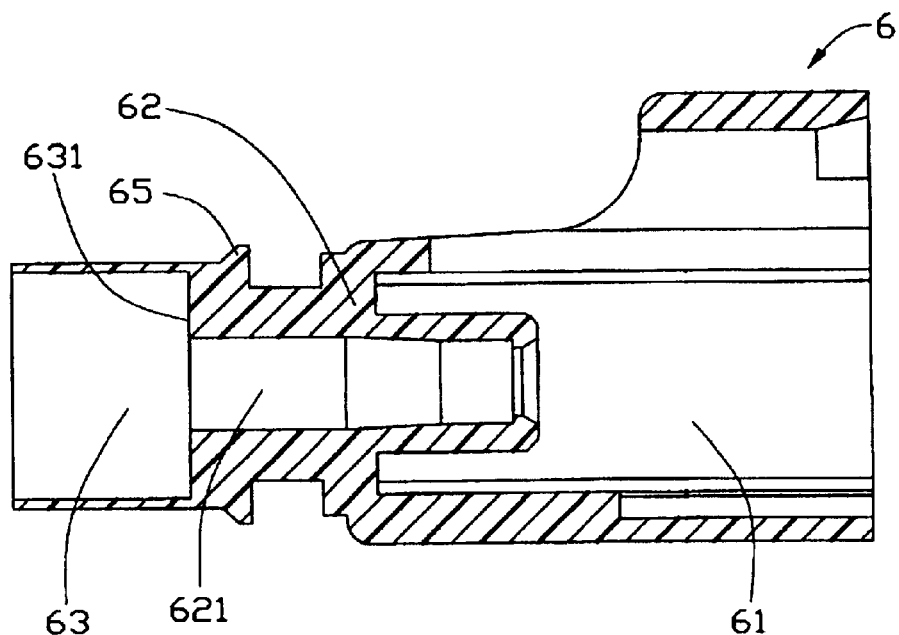
FIG. 7 is a cross-sectional view of the receptacle housing of FIG. 6.
Figure 8:
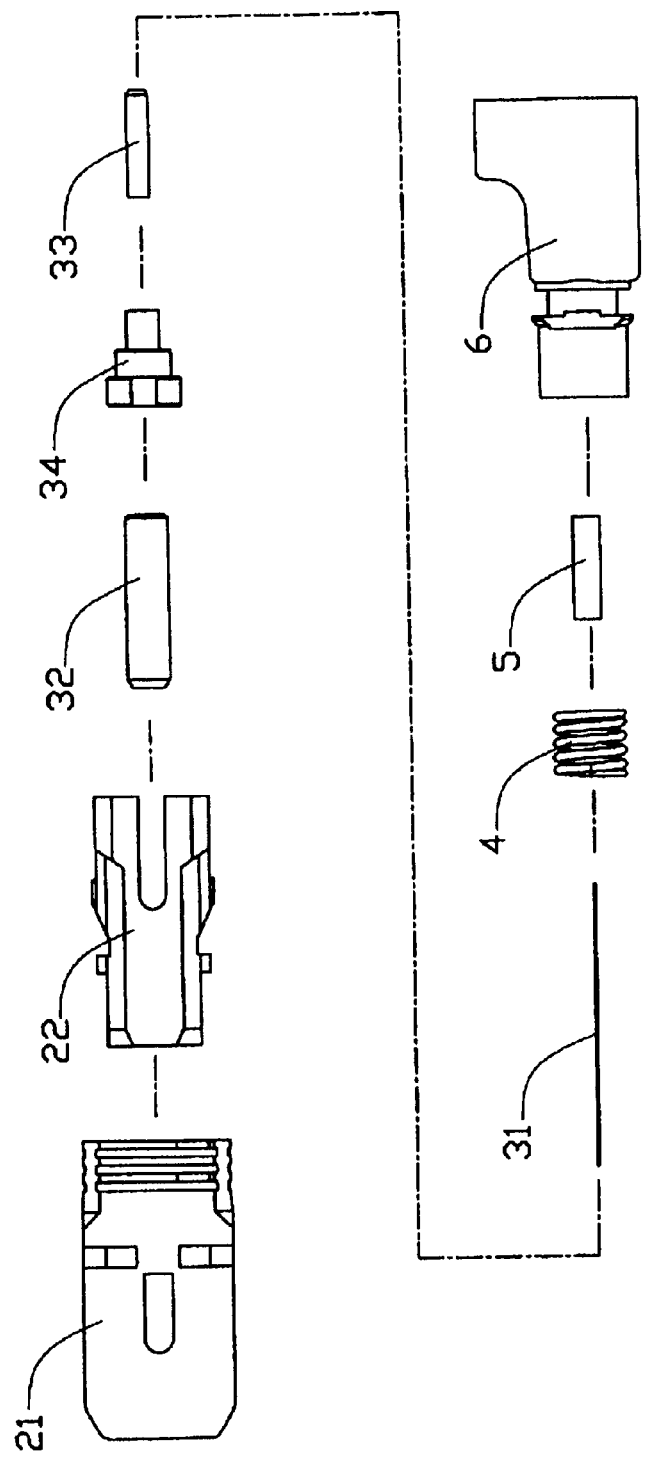
FIG. 8 is a side, exploded view of the optical fiber converter of FIG. 1.

Referring to FIG. 6 and FIG. 7, the receptacle housing 6 is adapted to engage with an LC-type optical fiber connector (not shown). The receptacle housing 6 further defines a second opening 61 at a rear end (not labeled) for receiving the LC-type optical fiber connector and a spring-receiving cavity 63 at a front end (not labeled). A tubular portion 62 is formed at a mid-section of the receptacle housing 6. The tubular portion 62 defines a hole 621 therethrough, which hole 621 communicates between the spring-receiving cavity 63 and the second opening 61. The front end of the receptacle housing 6 has a cylindrical outer surface 64. A pair of latches 65 extend outwardly from the cylindrical outer surface 64.

Referring to FIGS. 2–8, in assembly, firstly, the inner housing 22 is inserted into the outer housing 21 from a rear end (not labeled) of the outer housing 21 to form the plug housing 2. The wedge-shaped protrusions 213 of the outer housing 21 slide along the corresponding inclined surfaces 2271 of the pair of second protrusions 227, respectively. Thus, the second protrusions 227 pass through the wedge-shaped protrusions 213 and engage in the corresponding cutouts 212, respectively. Since the length of each cutout 212 is greater than the distance between the corresponding second protrusion 227 and first protrusion 226, the outer housing 21 slideably engages with the inner housing 22, and the sidewalls 211 at the cutouts 212 block the corresponding first and second protrusions 226, 227 to limit the axial movement of the inner housing 22 in the outer housing 21. Secondly, a second end (not labeled) of the second ferrule 33 is inserted into the through hole 51 of the sleeve 5 and is coaxially received therein. The spring 4 is pushed over a rear end (not labeled) of the ferrule holder 34, with the spring 4 surrounding the ferrule holder 34. The ferrule subassembly 3 is inserted into the inner housing 22. The cylindrical first inner surface 2251 of the second housing cavity 225 cooperates with the cylindrical outer surface (not labeled) of the flanges 343 to position the ferrule subassembly 3 therein. The first ferrule 32 extends into the first housing cavity 224 for engagement with the SC-type optical fiber connector. Lastly, the receptacle housing 6 is inserted into the plug housing 2, the cylindrical outer surface 64 of the receptacle housing 6 suitably inserting into the second housing cavity 225 and engaging with the cylindrical second inner surface 2252, with the pair of latches 65 extending from the cylindrical outer surface 64 and engaging with the corresponding mounting cutouts 228 of the inner housing 22. Thus, the plug housing 2 and receptacle housing 6 latch together. The sleeve 5 on the second ferrule 33 is received in the hole 621 of the tubular portion 62. A first end (not labeled) of the spring 4 is received in the spring-receiving cavity 63, and resiliently abuts an inner surface 631 of the spring-receiving cavity 63. A second end (not labeled) of the spring 4 resilient abuts the flanges 343, pushing the ferrule subassembly 3 forward in the second housing cavity 225. Thus the spring 4 urges the ferrule holder 34 forward into the inner housing 22.

Referring to FIG. 1 and FIG. 2, in use, the optical fiber converter 100 interconnects an SC-type optical fiber connector (not shown) and an LC-type optical fiber connector (not shown). The first protrusions 226 of the inner housing 22 are adapted to engage with two latches (not shown) of the SC-type optical fiber connector. The first ferrule 32 is adapted to engage with a ferrule (not shown) of the SC-type optical fiber connector, and the ferrule of the SC-type optical fiber connector pushes the ferrule subassembly 3 to move backward when the optical fiber converter 100 is plugged into the SC-type optical fiber connector. Thus, the second cylinder 342 (see FIG. 3) of the ferrule holder 34 moves into the hole 621 (see FIG. 7) of the receptacle housing 6, the sleeve 5 also moves backward in the hole 621, the rear end of tubular portion 62 (see FIG. 7) prevents the sleeve 5 from moving out of the hole 621, and the spring 4 resiliently abuts the ferrule subassembly 3 to ensure the contact of the first ferrule 32 with the ferrule of the SC-type optical fiber connector. The inclined portions 214 of the outer housing 21 are adapted to detach the optical fiber converter 100 from the SC-type optical fiber connector when the outer housing 21 moves backward on the inner housing 22. Thus, the ferrule subassembly 3 moves forward under the resilient force of the spring 4. The sleeve 5 is adapted to engage with the LC-type optical fiber connector and to coaxially align the second ferrule 33 of the ferrule subassembly 3 with a ferrule (not shown) of the LC-type optical fiber connector. Obviously, the optical fiber 31 can be an optical attenuation fiber. Thus, the optical fiber converter 100 can also work as an optical attenuator which interconnects two different types of optical fiber connectors.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber converter adapted to interconnect a first optical fiber connector and a second optical fiber connector, each of a different type, comprising:

a ferrule subassembly comprising a first ferrule having a first central hole extending therethrough, a second ferrule having a second central hole extending therethrough, a ferrule holder and an optical fiber, the first ferrule and the second ferrule fixedly held by the ferrule holder, the first central hole and the second central hole coaxially aligned, the optical fiber retained in the first and second central holes;

a sleeve coaxially retaining the second ferrule for engaging with the second optical fiber connector;

a plug housing comprising an outer housing and an inner housing surrounded by the outer housing, the outer housing slideably engaging with the inner housing, and the inner housing retaining the ferrule holder therein, the plug housing being adapted to engage with the first optical fiber connector;

a receptacle housing inserted in the inner housing and adapted to engage with the second optical fiber connector, the receptacle housing comprising a second opening for receiving the second optical fiber connector, a tubular portion having a hole therethrough for receiving the sleeve and the second ferrule, and a spring-receiving cavity, the hole being in communication with the second opening and with the spring-receiving cavity; and a spring surrounding the ferrule holder and located in the spring-receiving cavity of the receptacle, and urging the ferrule holder forward into the inner housing.

2. The optical fiber converter as described in claim 1, wherein a first end of the first ferrule and a first end of the second ferrule are held by the ferrule holder and a second end of the second ferrule is retained in the sleeve.

3. The optical fiber converter as described in claim 2, wherein the first ferrule has a tapered surface on the first end and in communication with the first central hole, and the second ferrule has a tapered surface on the first end and in communication with the second central hole.

4. The optical fiber converter as described in claim 1, wherein the first and second central holes axially extend through the first and second ferrules, respectively.

5. The optical fiber converter as described in claim 1, wherein the ferrule holder defines a first cavity and a second cavity therein, the first cavity is coaxially aligned with and communicates with the second cavity, and the first and second cavities retainingly receive the first and second ferrules, respectively.

6. The optical fiber converter as described in claim 1, wherein the optical fiber is an optical attenuation fiber.

7. The optical fiber converter as described in claim 1, wherein the plug housing further comprises an outer housing and an inner housing surrounded by the outer housing, and the outer housing slideably engages with the inner housing.

8. The optical fiber converter as described in claim 1, wherein the inner housing comprises a first housing cavity, a second housing cavity in communication with the first housing cavity, at least a first protrusion extending from the inner housing and at least a second protrusion having an inclined surface.

9. The optical fiber converter as described in claim 8, wherein the outer housing comprises a plurality of sidewalls and a first opening surrounded by the sidewalls for receiving the inner housing, at least a cutout is defined in each of at least two of the sidewalls, the at least a first and at least a second protrusions of the inner housing slideably engage in the cutouts of the outer housing, and the sidewalls at the cutouts cooperate with the at least a first and at least a second protrusions to limit axial movement of the inner housing in the outer housing.

10. The optical fiber converter as described in claim 9, wherein the first protrusion of the inner housing is adapted to engage with the first optical fiber connector, and the outer housing further comprises an inclined portion adjacent the cutout for detaching the optical fiber converter from the first optical fiber connector.

11. The optical fiber converter as described in claim 8, wherein the ferrule holder further comprises a plurality of flanges extending therefrom to engage with an inner surface of the second housing cavity of the inner housing.

12. The optical fiber converter as described in claim 11, wherein the first ferrule extends into the first housing cavity.

13. The optical fiber converter as described in claim 12, wherein the spring urges the ferrule holder forward into the second housing cavity.

14. The optical fiber converter as described in claim 1, wherein the receptacle housing is L-shaped.

15. An optical fiber converter adapted to interconnect a first optical fiber connector and a second optical fiber connector, each of a different type, comprising:

a ferrule subassembly comprising a first ferrule having a first central hole extending therethrough, a second ferrule having a second central hole extending therethrough, a ferrule holder, and an optical fiber, wherein the first and second ferrules have different outer diameters, a first end of the first ferrule and a first end of the second ferrule are held by the ferrule holder, a tapered surface is defined on one of the first ends of the first and second ferrules, the tapered surface is in communication with the corresponding central hole, the first central hole and the second central hole are coaxially aligned, and the optical fiber is retained in the first and second central holes;

a sleeve coaxially retaining the second ferrule for engaging with the second optical fiber connector;

a plug housing comprising an outer housing and an inner housing surrounded by the outer housing, the outer housing slideably engaging with the inner housing, the inner housing retaining the ferrule holder therein, the plug housing being for engaging with the first optical fiber connector; and a receptacle housing fixed with the plug housing, comprising a second opening for receiving the second optical fiber connector, a tubular portion having a hole therethrough for receiving the sleeve and the second ferrule, and a spring-receiving cavity, the hole being in communication with the second opening and with the spring-receiving cavity; and a spring surrounding the ferrule holder and located in the spring-receiving cavity of the receptacle, and urging the ferrule holder forward into the inner housing.

16. The optical fiber converter as described in claim 15, wherein a second end of the second ferrule is retained in the sleeve.

17. The optical fiber converter as described in claim 15, wherein the ferrule holder defines a first cavity and a second cavity therein, the first cavity is coaxially aligned with and is in communication with the second cavity, and the first and second cavities retainingly receive the first and second ferrules, respectively.

18. The optical fiber converter as described in claim 15, wherein the optical fiber is an optical attenuation fiber.

19. The optical fiber converter as described in claim 15, wherein the first optical fiber connector is an SC-type (Subscriber Connector-type) optical fiber connector and the second optical fiber connector is an LC-type optical fiber connector.

\* \* \* \* \*